US011066726B2

(12) United States Patent
Dundas

(10) Patent No.: US 11,066,726 B2
(45) Date of Patent: Jul. 20, 2021

(54) PROCESS FOR IMPROVING THE GRADE AND OPTICAL QUALITY OF ZIRCONS

(71) Applicant: ILUKA Resources Limited, Perth (AU)

(72) Inventor: Phillip James Dundas, Perth (AU)

(73) Assignee: ILUKA Resources Limited, Perth (AU)

(*) Notice: Subject to any disclaimer, the term of this patent is extended or adjusted under 35 U.S.C. 154(b) by 148 days.

(21) Appl. No.: 15/548,334

(22) PCT Filed: Feb. 8, 2016

(86) PCT No.: PCT/AU2016/050074
§ 371 (c)(1),
(2) Date: Aug. 2, 2017

(87) PCT Pub. No.: WO2016/127209
PCT Pub. Date: Aug. 18, 2016

(65) Prior Publication Data
US 2018/0023170 A1 Jan. 25, 2018

(30) Foreign Application Priority Data
Feb. 9, 2015 (AU) .............................. 2015900398

(51) Int. Cl.
C22B 34/14 (2006.01)
C22B 9/10 (2006.01)
(Continued)

(52) U.S. Cl.
CPC .............. C22B 34/14 (2013.01); C01B 33/20 (2013.01); C01G 23/008 (2013.01); C01G 25/06 (2013.01);
(Continued)

(58) Field of Classification Search
CPC ...... C01B 33/20; C01G 23/008; C01G 25/06; C01G 49/14; C01P 2006/62;
(Continued)

(56) References Cited
U.S. PATENT DOCUMENTS 1,618,286 A * 2/1927 Kinzie ................... C01G 25/00
106/450
4,746,497 A * 5/1988 Jenkins .................. C01G 25/02
423/69
(Continued)

FOREIGN PATENT DOCUMENTS

AU 498667 B2 * 3/1979 ............... B03B 1/04
CN 105 217 641 A 1/2016
(Continued)

OTHER PUBLICATIONS

Naher S. et al. "Production and purification of zircon opacifier found in the coastal area of Bangladesh" Journal of Materials Processing Technology, vol. 205, No. 1-3, 2008, pp. 203-206.

Primary Examiner — Anthony J Zimmer
Assistant Examiner — Syed T Iqbal
(74) Attorney, Agent, or Firm — Cooley LLP; Matthew Pavao

(57) ABSTRACT

A process for improving the grade and optical quality of zircon, comprising: baking a mixture of a zircon feed and concentrated sulphuric acid at a baking temperature in the range of from 200 up to 400° C., and for a time to form water leachable sulphates with impurities therein including at least iron and titanium; leaching the baked mixture to dissolve the leachable sulphates; and separating the zircon from the leachate containing the leached sulphates, which separated zircon is thereby of improved grade and optical quality.

17 Claims, 3 Drawing Sheets

(51) Int. Cl.
*C04B 35/626* (2006.01)
*C04B 35/48* (2006.01)
*C01G 49/14* (2006.01)
*C01G 23/00* (2006.01)
*C01G 25/06* (2006.01)
*C01B 33/20* (2006.01)
*C22B 3/08* (2006.01)

(52) U.S. Cl.
CPC ............ *C01G 49/14* (2013.01); *C04B 35/481* (2013.01); *C04B 35/62625* (2013.01); *C04B 35/62645* (2013.01); *C22B 3/08* (2013.01); *C22B 9/10* (2013.01); *C01P 2006/62* (2013.01); *C01P 2006/63* (2013.01); *C01P 2006/64* (2013.01); *C01P 2006/80* (2013.01); *C04B 2235/72* (2013.01); *C04B 2235/9661* (2013.01)

(58) Field of Classification Search
CPC .............. C01P 2006/63; C01P 2006/64; C01P 2006/80; C04B 2235/72; C04B 2235/9661; C04B 35/481; C04B 35/62625; C04B 35/62645; C22B 34/14; C22B 3/08; C22B 9/10
See application file for complete search history.

(56) References Cited

U.S. PATENT DOCUMENTS 5,637,281 A * 6/1997 Mayes .................... C22B 34/14
423/86
7,063,824 B1 * 6/2006 Coetzee .................. C01G 25/00
423/419.1

FOREIGN PATENT DOCUMENTS

| CN | 105 502 423 A | 4/2016 |
| EP | 0670376 A2 | 9/1995 |
| JP | S4423975 Y1 | 10/1969 |
| RU | 2 040 566 C1 | 7/1995 |

* cited by examiner

PROCESS FOR IMPROVING THE GRADE AND OPTICAL QUALITY OF ZIRCONS

CROSS-REFERENCE TO RELATED APPLICATIONS

This application is a national stage application, filed under 35 U.S.C. 371, of International Application No. PCT/AU2016/050074, filed on Feb. 8, 2016, which claims priority to, and the benefit of, Australian Patent Application No. 2015900398, filed Feb. 9, 2015. The contents of each of these applications are incorporated by reference in their entirety.

FIELD OF THE INVENTION

This invention relates generally to the upgrading of zircon and in particular provides a process for improving the grade and optical quality of zircons. Of particular interest is the application of the process of the invention to the upgrading of lower quality chemical zircons to premium or ceramic grade zircons.

BACKGROUND OF THE INVENTION

Zircon is used in tiles and ceramics as an opacifier and to add whiteness, brightness, chemical resistance and scratch resistance to glazes. The presence of impurities such as iron, titanium, lanthanides and actinides can reduce the brightness imparted by zircon and introduce colour to glazes.

The presence of iron in glazes can impart many different colours depending on its form and other species present in the glaze. Iron has been reported to generally darken and contribute red or yellow tinges.

Titanium dioxide can be used in glazes as an opacifier but is found to introduce coloured hues to glazes. The use of anatase has been found to introduce a blue hue, whilst rutile has been found to introduce a slight yellow tint to glazes. Trivalent titanium ($Ti^{3+}$ or $Ti_2O_3$) is black and consequently, when present, will increase the light absorption of a glaze, reducing its brightness.

Lanthanide (rare earth) elements are known glass colourants. Praseodymium in particular is known to produce yellow to green colours in glazes and a powerful yellow colour when combined with zircon (commercial name praseodymium zircon yellow). Similarly neodymium is known to produce blue to violet colours in glazes, erbium may produce pink hues and cerium can add red tints. Uranium is also know to produce strong orange to red colours in glazes in a +4 oxidation state and yellow to green colours in glasses and glazes when in a +6 oxidation state. To visibly achieve these effects a substantial amount of element is required (i.e. >1%), however even at trace levels these are still likely to effect the overall whiteness of a glaze.

Currently, mined zircon is sold as either premium, or ceramic, grade, i.e. suitable for the aforedescribed dominant market in use as an opacifier, or chemical grade and therefore suitable for processing to zirconium oxychloride, the precursor of most zirconium chemicals. Applicant is not aware of any commercially practiced process for the upgrading of chemical grade zircon to premium grade zircon but there are known processes for improving the optical quality of premium grade zircon.

One such process is the Hot Acid Leach (HAL) process. This process is described in EP0670376. The HAL process involves mixing zircon with minimal concentrated sulphuric acid. The acid wets the zircon particle surfaces and when a small amount of water is added it rapidly generates a large amount of heat on the surface of the particles due to the hydration of the sulphuric acid. The combination of sulphuric acid and heat causes iron and other impurities on the surface of the zircon to react with the acid. The reacted zircon is then washed to remove any residual acid and sulphated species such as iron and titanium.

The HAL process relies on heat generated from the reaction between water and sulphuric acid and is only effective at removing surface coatings from zircon. The HAL process also has a relatively short reaction time (approximately 1 hour). The HAL process is not effective for removing impurities present in forms other than coatings. Such other forms may include discrete particles and impurities present in the zircon grain or structure.

Variations of this process are commonly practised by different commercial suppliers of zircon.

International patent publication WO 2005/116277 discloses a process for "upgrading an inferior grade of zircon to a superior grade . . . suitable for use as a glaze opacifier". The process involves calcining a mixture of ground zircon and a mineraliser (e.g. an alkaline metal halide or ammonium sulphate) at 600 to 900° C., and thereafter washing and further comminuting the calcined product. The achievement of the higher grade suitable for use as a glass opacifier was viewed as necessarily involving removal of a proportion of the ferric and titanium oxide impurities.

More generally, a known means of cracking or decomposing refractory minerals is via reaction with concentrated sulphuric acid at elevated temperatures. Two examples of this include the Sulphate Process for producing $TiO_2$ pigment from ilmenite or titanium slags, and sulphuric acid cracking of rare earth phosphates, such as monazite. In each case the process involves decomposing the ore using concentrated sulphuric acid at temperatures in the vicinity of 150-250° C. The resulting mixtures are then dissolved in water or dilute acid to extract valuable species. This approach is not suitable for zircon because zircon is highly refractory, and it will not react under the above conditions. Moreover, the requirement is to preserve the zircon as an end product, whereas the above processes involve the decomposition of the feedstock.

There would be considerable value in an economical process for improving the grade and optical quality of zircons that could be applied to upgrade chemical grade zircons to premium grade zircons.

Reference to any prior art in the specification is not an acknowledgment or suggestion that this prior art forms part of the common general knowledge in any jurisdiction or that this prior art could reasonably be expected to be combined with other pieces of prior art by a skilled person in the art.

SUMMARY OF THE INVENTION

The invention entails a concept of baking a mixture of a zircon feed and concentrated sulphuric acid at a baking temperature and for a time to form water leachable sulphates with impurities in the zircon, including at least iron and titanium. The baking is conducted at a temperature in the range of from 200° C. up to 400° C. The process differs from the aforedescribed processes such as the Sulphate Process in that the mechanism is not decomposition of the zircon but a means of purification through partial decomposition of impure or damaged phases. It is believed that at the proposed temperatures and conditions, radiation-damaged zircon, and zircon with high levels of impurities will react with the sulphuric acid, allowing the impurities to be extracted from the bulk zircon by water leaching.

The invention accordingly provides a process for improving the grade and optical quality of zircon, comprising:

baking a mixture of a zircon feed and concentrated sulphuric acid (preferably >96% $H_2SO_4$ w/w) at a baking temperature in the range of from 200 up to 400° C., and for a time to form water leachable sulphates with impurities therein including at least iron and titanium;

leaching the baked mixture to dissolve the leachable sulphates; and separating the zircon from the leachate containing the leached sulphates, which separated zircon is thereby of improved grade and optical quality.

In an embodiment, the baking temperature range is from 250° C. Alternatively, or additionally, the baking temperature range is up to 350° C. Preferably, the temperature range is from 270 to 330° C. Baking temperatures within this range have been found to result in a high impurity removal efficiency, particularly for impurities including Ti, P, Th, and Fe from the zircon feed.

In an embodiment, the process additionally includes preparing the zircon feed for the baking step by comminution to reduce the particle size of the zircon and so enhance its reactivity. While a number of different comminution processes may be used, it is preferred that the comminution step includes pulverizing or milling the zircon, and more preferably, milling the zircon. These forms of comminution have been found to result in zircon of small size and having a narrow particle size distribution which is advantageous for treatment.

In an embodiment, the zircon feed has a d50 value of 50 µm or less. Preferably, the zircon feed has a d50 value of 40 µm or less. More preferably, the zircon feed has a d50 value of 20 µm or less. Most preferably, the d50 value of the zircon is 10 µm or less. The degree of grinding required will depend on the specifications of the desired product (such as final particle size, purity, etc.). However, it will be appreciated that a greater degree of grinding comes at increased cost.

In an embodiment, the step of leaching the baked mixture is effective to remove soluble sulphate species including sulphate species of iron, titanium, lanthanide and actinide elements.

In an embodiment, the leachate, used in the step of leaching the baked mixture, is water or a dilute acid.

In an embodiment, the process further includes alkaline leaching the separated zircon to reduce alumina and silica enriched during the partial decomposition of the zircon.

In an embodiment, the step of leaching the baked mixture is conducted at a temperature of below 50° C. to minimise the formation of silica gels and the hydrolysis and re-precipitation of impurity species.

In an embodiment, the sulphuric acid and zircon feed are mixed to ensure that solids in the zircon feed are fully wetted.

In an embodiment, the sulphuric acid to zircon mass ratio is 1:9 to 1:2, preferably 1:4 to 1:3.

In an embodiment, the concentrated sulphuric acid has a concentration of 96 wt % or greater. Preferably, the concentrated sulphuric acid has a concentration of at least 98 wt %.

In an embodiment, the process is a process for improving the grade and optical quality of chemical grade zircon, and said separated zircon is a premium grade zircon.

In an embodiment, there is substantially no decomposition of undamaged zircon.

As used herein, except where the context requires otherwise, the term "comprise" and variations of the term, such as "comprising", "comprises" and "comprised", are not intended to exclude further additives, components, integers or steps.

DETAILED DESCRIPTION OF THE EMBODIMENTS

Figure 1:
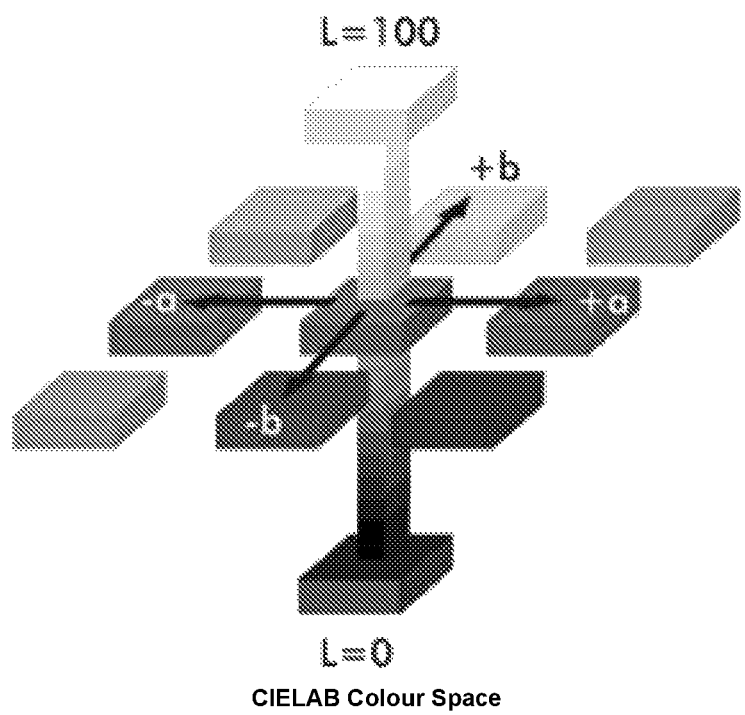
FIG. 1 is a grey scale representation of the CIELAB standard colour scale.

The zircon can be baked unground or ground. The acid reacts with impurities on the zircon surfaces, and in combination with elevated temperatures will also result in the partial decomposition of damaged and impure zircon phases. It is hypothesized that this partial decomposition is key to the extraction of inherent impurities in the zircon, which are not removed by other existing processes. It will be appreciated that if the impurities are inherent in the zircon and they are the source of tinting issues then the grinding of the zircon before the bake process will allow the process to more readily access the inherent impurities. Furthermore, the amount of grinding would be expected to have a correlation to the level of extraction of the impurities. This could potentially allow the possibility of producing zircons with different dE (a measure of optical quality, further explained below) to match end user requirements by varying the grinding.

Advantageously, the leach is effective to remove soluble sulphate species including iron, titanium, lanthanide and actinide elements. Solid liquid separation and solids washing is then performed to separate the impurity laden leachate liquor from the zircon.

The preferred leachate for the leaching step is water, but a dilute acid may alternatively be employed.

Depending on the impurities present and the zircon grade required, the leached product may then undergo polishing stages which may include alkaline leaching to reduce aluminium and silica (enriched during the partial decomposition of the zircon). Leaching with acidic media may also be incorporated to remove any residual impurities that may have re-precipitated as hydrolysis products during the water and/or alkaline leaching stages.

Zircon feed to the baking step is preferably of a mineral quality similar to that representing a pure zircon product. This is typically achieved through a combination of gravity, magnetic and electrostatic separation. Although impurities can be tolerated in the process, elevated levels of impurities may require additional acid and result in a lower quality final product.

The reactivity of the zircon and the total impurity removal may be improved by reducing the particle size of the zircon. This may be achieved via grinding or other comminution methods and is compatible with the end use of the zircon as an opacifier as it is normally ground. It is hypothesized that zircon containing elevated levels of impurities or radiation damage is preferentially fractured during comminution due to internal stresses that are introduced in the crystal lattice i.e. trace element substitution or damage. Consequently comminution exposes impurities as well as increasing surface area of the zircon, consequently increasing reactivity.

It is also noted, that the greater the degree of comminution applied (i.e. the smaller the particle size) the greater the amount of zirconia ($ZrO_2$) is also dissolved in the process. Consequently there will be a trade-off between impurity removal and loss of zirconia. When zirconia is dissolved, this lowers the total $ZrO_2$ content of the zircon. Excessive comminution may also cause difficulty downstream with regards to mixing acid and zircon and solid/liquid separation after water leach and product polishing stages. Consequently it is sometimes preferable to treat the zircon as-is rather than activating it via comminution. It should also be noted that the use of zircon in ceramic (glaze) applications involves the grinding of the zircon to a flour, so selling a pre-ground product will not be a problem in terms of the end use of the zircon.

The zircon is preferably mixed with concentrated sulphuric acid (preferably >96% $H_2SO_4$ w/w) at an acid:zircon mass ratio of 1:9 to 1:2 (more preferably 1:4 to 1:3). The limiting factor for sulphuric acid addition is the wettability of the solids: The acid and zircon are preferably thoroughly mixed to ensure the solids are fully wetted. Failure to fully wet the zircon with acid may result in diminished impurity extraction. Poor wetting of solids may be caused by insufficient acid addition or poor mixing of the acid and zircon.

Addition of excess acid may assist zircon wetting but results in higher process costs and may cause problems with solids liquid separation further downstream due to the possible formation of silica gels.

The acid/zircon mixture is preferably baked at temperatures in the range 200-400° C. (more preferably 250-350° C.) for 2 to 6 hours depending on the zircon characteristics and bake temperature. In general, the bake temperature and the reaction time can also be tailored to the desired dE of the end product. Higher temperatures will improve reaction kinetics, reducing the required reaction time, however, as temperature is increased the rate of sulphate decomposition also increases—which may result in lower extraction, formation of insoluble decomposition products, and reduced acid efficiency (due to acid decomposition). Lower temperatures are preferable, however the reaction with the sulphuric acid is found to be thermally controlled and below a critical temperature (which may vary depending on zircon characteristics) extraction efficiency is observed to decrease rapidly.

It is hypothesized that this temperature effect is due to the partial decomposition of zircon. At lower temperatures zircon is highly refractory and does not react, however as temperature is increased, partial decomposition of the zircon occurs and greater impurity removal is observed in conjunction with loss of zirconium from the zircon product.

Mixing during baking is preferable as this limits the degree to which the reaction mixture can sinter, forming hard lumps which take time to break down during water leaching. Mixing during baking also ensures the best probability of maximum impurity extraction through better interaction of acid and zircon.

The baked product is preferably allowed to cool before leaching with excess water or dilute acid. The leach stage may dissolve soluble sulphates including iron, titanium, lanthanide and actinide species. The reacted zirconia may also enter solution.

During the leach, preferably a water leach, it is preferred to control the temperature to be below 50° C. to minimise the formation of silica gels and the hydrolysis and re-precipitation of species such as titanium and thorium which will impact the final product quality. Dissolved zirconium may also hydrolyse and re-precipitate, however this will not adversely impact the product grade.

The leach liquor or leachant contains the impurities extracted from the zircon including, iron, titanium, lanthanides, actinides and any zirconium that may have reacted. Due to highly acidic process conditions some silica may form gels. These gels may make filtration very difficult. Multiple wash and decant steps are undertaken prior to filtration, to improve the filterability of solids.

In practice an up current classifier or similar elutriation device may be used to wash the solids and remove silica gels, colloids and ultrafine material prior to filtration.

For unground material free of silica gels, vacuum filtration has been found to be successful for solid/liquid separation, however for material with a large amount of fines (<10 μm), pressure filtration or counter current decantation followed by filtration or centrifugation would be recommended.

Depending on the impurities present and the required zircon grade, including the required dE, the washed product may then be polished via alkaline and/or acidic leaching stages. The purpose of the alkaline leach is to remove residual silicates and aluminosilicates that may be present. The alkaline leach stage can also convert some impurities to oxides or hydrates, which are then more amenable to a second acid leach. An acid leach stage is intended to dissolve species that may have re-precipitated during the water leach and, if present, alkaline leach stages. Non-sulphur based acids may also be used to remove otherwise insoluble sulphate species formed in the bake stage and may also potentially remove species that are not soluble in sulphuric acid such as radium.

The alkaline leach lixiviant may include, but is not limited to, one or more alkaline and/or alkaline earth metal hydroxides and/or carbonates (for example NaOH, $Na_2CO_3$, KOH, $Mg(OH)_2$ and $MgCO_3$). Temperatures in excess of 80° C. are required to achieve reasonable rates and extents of reaction with silicates and aluminosilicates. Reaction times may vary depending on the specific type and levels of impurities as well as lixiviant type, concentration and reaction temperature, but typically should be in the range of 1-4 hours.

Acid leaching, whether the initial leach or an additional leach after an initial water leach, may use organic or mineral acids including, but not limited to, hydrochloric acid, sulphuric acid, acetic acid or oxalic acid. The temperature of the acid leach system is dependent on the type of impurities to be removed and the type of acid used, for example dilute hydrochloric may be used at room temperature to remove residual iron and calcium from the zircon, however, a hot acid solution may provide superior kinetics. Reaction times may vary depending on the specific type and levels of impurities as well as lixiviant type, concentration and reaction temperature, but typically will be in the range of 1-4 hours.

After polishing the zircon typically undergoes a final wash to remove trace impurities and lixiviant before being filtered and dried to yield the upgraded zircon product.

It will be understood that the invention disclosed and defined in this specification extends to all alternative combinations of two or more of the individual features mentioned or evident from the text or drawings. All of these different combinations constitute various alternative aspects of the invention.

Examples

In order to compare and describe colour meaningfully and reproducibly, the CIELAB standard colour scale is used throughout the world. Shown in FIG. 1 in cube form, the L axis runs from top to bottom. The maximum value for L is 100, which represents perfect white whilst the minimum value for L is 0, which represents black. The a and b axes have no numerical units. Positive a is red, negative a is green; positive b is yellow, negative b is blue.

The CIELAB colour scale can also be used to express the differences in colour between objects. ΔL, Δa and Δb indicate difference along each axis. The total colour difference is often expressed as dE or ΔE. ΔE on its own is not an indication of quality.

Table 1 compares two white tiles to determine the colour difference or ΔE.

TABLE 1

CIELAB White Tile Data

|   | Tile A | Tile B |    | Tile A − Tile B |
|---|--------|--------|----|-----------------|
| L | 93.00  | 92.70  | ΔL | 0.30            |
| a | 0.20   | 0.21   | Δa | −0.01           |
| b | 3.10   | 3.33   | Δb | −0.23           |

Comparing Tile A to Tile B shows Tile A is lighter (positive ΔL) and less yellow (negative Δb). The ΔE is calculated using the formula:

$$\Delta E = \sqrt{(\Delta L^2)+(\Delta a^2)+(\Delta b^2)}$$

$$\Delta E = \sqrt{(0.30^2)+(-0.01^2)+(-0.23^2)} = 0.38$$

The difference, or ΔE (or dE), between the two tiles is 0.38. In most instances, but not all, the human eye will struggle to differentiate between similar colours that have a ΔE of <0.5.

To apply the concept of dE to zircon optical quality, a glaze is produced and compared to that produced using a zircon standard (such as the commercially available Zircosil). It can therefore be seen how the presence of impurities such as iron, titanium and lanthanides may impact the perceived optical quality (dE) of a tile glaze, by introducing coloured tints and decreasing its brightness.

Example 1

A sample of zircon with an average particle size of approximately 50 microns, was baked with 98% $H_2SO_4$ at an acid:zircon mass ratio of 1:3 for 3 hours at approximately 300° C. The resulting solids were leached with ambient temperature water for 3 hours at a solids:liquid mass ratio of 1:9.

The resulting solids were filtered and washed before being leached with 1 mol/L HCl and 5% $MgCl_2$ at 80° C. for 1 h.

The mixture was filtered and solids washed with a water:solids mass ratio of 2:1. The mass yield of dry zircon was 95%, with the assays of feed and products provided in the table below. The dE value of the feed and product compared to an Eneabba premium zircon were 1.2 and 0.34 respectively.

TABLE 2

Comparison between raw and treated zircon compositions

| Test | $TiO_2$ % | $Fe_2O_3$ % | $SiO_2$ % | $(Zr + Hf)O_2$ % | $P_2O_5$ % | $Al_2O_3$ % | $Cr_2O_3$ % | $CeO_2$ % | $La_2O_3$ % | $Y_2O_3$ % |
|---|---|---|---|---|---|---|---|---|---|---|
| Feed | 0.10 | 0.198 | 31.8 | 65.5 | 0.25 | 0.15 | 0.010 | <0.01 | <0.001 | 0.330 |
| Product | 0.01 | 0.014 | 33.2 | 65.2 | 0.16 | 0.05 | 0.007 | <0.01 | <0.001 | 0.239 |

In Table 2 above (as well as the Tables 3, 4, 5, and 7 below), proportions are wt %, and the assay reports zircon in the form of $(Zr+Hf)O_2$. The weight fraction is reported in this form as Zr and Hf are chemically similar and for all intents and purposes in most zircon end uses Hf may be considered equivalent to Zr. Hf is present in very low concentrations in the zircon feed (typically of the order of 1 wt % or less when calculated as $HfO_2$).

Example 2

A sample of zircon with an average particle size of approximately 50 microns, was split in two and half of the sample ground to a d50 of approximately 10 microns. Both samples were then baked with 98% $H_2SO_4$ at an acid:zircon mass ratio of 1:3 for 3 hours at approximately 300° C. The resulting solids were leached with ambient temperature water for 3 hours at a solids:liquid mass ratio of 1:9.

The mixture was filtered and solids washed with a water:solids mass ratio of 2:1. The mass yield of dry zircon was 95% and 86% for the unground and ground and zircon respectively. The assays of feed and products provided in the table below. CIELAB measurements were not taken on these samples

TABLE 3

Comparison between raw and treated zircon compositions (ground and unground)

| Test | $TiO_2$ % | $Fe_2O_3$ % | $SiO_2$ % | $(Zr + Hf)O_2$ % | $P_2O_5$ % | $Al_2O_3$ % | $Cr_2O_3$ % | $CeO_2$ % | $La_2O_3$ % | $Y_2O_3$ % |
|---|---|---|---|---|---|---|---|---|---|---|
| Feed | 0.10 | 0.198 | 31.8 | 65.5 | 0.25 | 0.15 | 0.010 | <0.01 | <0.001 | 0.330 |
| Unground | 0.04 | 0.024 | 32.7 | 65.3 | 0.17 | 0.07 | 0.011 | <0.01 | <0.001 | 0.250 |
| Ground | 0.01 | 0.008 | 34.1 | 63.9 | 0.17 | 0.03 | <0.001 | <0.01 | <0.001 | 0.228 |

Example 3

A sample of zircon with an average particle size of approximately 110 microns was ground to a d50 of approximately 50 microns. The zircon was then baked with 98% $H_2SO_4$ at an acid:zircon mass ratio of 1:3 for 3 hours at approximately 300° C. The resulting solids were leached with ambient temperature water for 3 hours at a solids:liquid mass ratio of 1:9.

Three of the samples were subjected to subsequent polishing steps. The first sample was leached with 1 mol/L sodium hydroxide at 80° C. for 1 h. The second sample, was leached with 1 mol/L HCl at 80° C. for 1 h. The final sample was leached with 1 mol/L NaOH and 10% w/w $Na_2CO_3$ at 80° C. for 1 h, the mixture was filtered and washed before being leached with 1 mol/L HCl at 80° C. for 1 h.

The final mixtures were filtered and washed with a water:solids mass ratio of 2:1. The mass yield of dry zircon for each of the samples was approximately 80%, with the assays of feed and products provided in the table below. CIELAB measurements were not taken on these samples.

TABLE 4

Comparison between raw and treated zircon compositions (subjected to different polishing steps)

| Sample | $TiO_2$ % | $Fe_2O_3$ % | $SiO_2$ % | $(Zr + Hf)O_2$ % | $P_2O_5$ % | $Al_2O_3$ % | $CeO_2$ % | $La_2O_3$ % | $Y_2O_3$ % |
|---|---|---|---|---|---|---|---|---|---|
| Feed | 0.83 | 0.37 | 31.3 | 63.4 | 0.35 | 1.95 | <0.01 | 0.01 | 0.38 |
| bake | 0.24 | 0.10 | 32.1 | 63.9 | 0.12 | 0.92 | <0.01 | <0.001 | 0.17 |
| Bake + NaOH | 0.27 | 0.11 | 31.7 | 64.8 | 0.12 | 0.95 | <0.01 | <0.001 | 0.17 |
| Bake + HCl | 0.21 | 0.09 | 32.9 | 64.0 | 0.12 | 0.96 | <0.01 | <0.001 | 0.18 |
| Bake + NaOH/ $Na_2CO_3$ + HCl | 0.20 | 0.09 | 32.1 | 65.8 | 0.11 | 0.88 | <0.01 | <0.001 | 0.17 |

Example 4

A sample of zircon with an average particle size of approximately 60 microns, was baked with 98% $H_2SO_4$ at an acid:zircon mass ratio of 1:3 for 2 hours at approximately 300° C. The resulting solids were leached with ambient temperature water for 3 hours at a solids:liquid mass ratio of 1:9.

The mixture was filtered and solids washed with a water:solids mass ratio of 2:1. The mass yield of dry zircon was 96%, with the assays of feed and products provided in the table below. CIELAB measurements were not taken on these samples.

TABLE 5

Comparison between raw and treated zircon compositions

| Sample | $TiO_2$ % | $Fe_2O_3$ % | $SiO_2$ % | $(Zr + Hf)O_2$ % | $P_2O_5$ % | $Al_2O_3$ % | $V_2O_5$ % | $CeO_2$ % | $La_2O_3$ % | $Y_2O_3$ % |
|---|---|---|---|---|---|---|---|---|---|---|
| Feed | 0.06 | 0.12 | 32.3 | 66.2 | 0.14 | 0.28 | <0.01 | <0.01 | 0.01 | 0.17 |
| Product | 0.01 | 0.02 | 33.0 | 65.7 | 0.09 | 0.19 | <0.001 | <0.01 | <0.001 | 0.16 |

Example 5

The impact of the baking temperature on the resultant grade of the zircon was assessed. Samples of zircon with an average particle size of approximately 60 microns were ground to a d50 of approximately 10 microns The zircon was then baked with 98% $H_2SO_4$ at an acid:zircon mass ratio of 1:4 for 2 hours at temperatures of 200° C., 250° C., 300° C., 320° C., 350° C., and 370° C. The resulting solids were leached with water for 3 hours at a solids:liquid mass ratio of 1:9.

Figure 2:
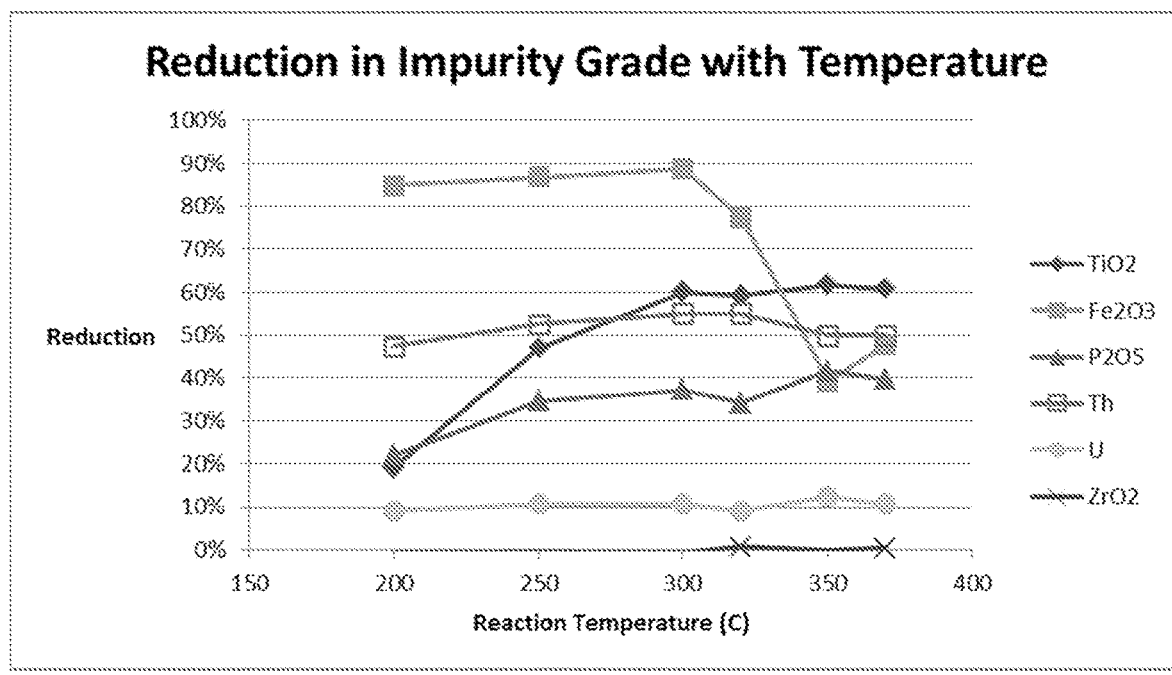
FIG. 2 is a graph showing the effect of baking temperature on the extraction of impurities from zircon.

FIG. 2 shows the effect of different baking temperatures on upgrading the zircon.

Broadly, increasing the bake temperature from 200° C. enhances the extraction of impurities from the zircon. In particular, there is a significant increase in the removal of Ti, a moderate improvement in the removal of P, and small improvements in the removal of Th and Fe at bake temperatures of 200° C. and above. As can be seen from FIG. 2, reduction in Ti, P, Th, and Fe peaks at a bake temperature of around 300° C. Below 200° C. the extraction efficiency of the impurities, such as Ti, P, and Fe, in the zircon feed drop sufficiently that the process is not commercially effective.

At bake temperatures of 300° C. or above, in particular above 320° C., the removal of Fe from the zircon decreases. There is also a small decrease in the removal efficiency of Th at temperatures of 350° C. and above. The inventors believe that the decrease in the removal efficiency of these impurities is due to the temperature being raised significantly above the boiling point of sulphuric acid (i.e. 337° C.). As such, in some embodiments the baking temperature range is preferably up to 337° C. Despite this reduction in the removal efficiency of Fe and Th, there is a continued increase in the removal efficiency of a number of other impurities, such as Ti, P, and U which is projected up to a bake temperature of 400° C.

Whilst there is a notable decrease in the removal efficiency of Fe at temperatures up to 400° C., this is offset by the increase in removal efficiency of Ti, P, and U. Without wishing to be bound by theory, the inventors are of the view that at temperatures above 400° C., the overall impurity removal efficiency will decrease due to the decomposition of sulphuric acid and/or the decomposition of sulphate species to less water soluble forms.

Thus, the baking process should not exceed a maximum temperature of 400° C. in order to ensure satisfactory removal of impurities.

Example 6

The impact of upstream comminution processes on the resultant grade of the zircon was assessed. Samples of zircon subjected to different comminution processes were then baked with 98% $H_2SO_4$ at an acid:zircon mass ratio of 1:4 for 2 hours at a temperature of 300° C. The resulting solids were leached with water for 3 hours at a solids:liquid mass ratio of 1:1.

The particle size distributions for the pulverized and milled zircon samples are provided below.

TABLE 6

Particle size distributions for pulverised and milled zircon

| Sample | d50 | d10 | d90 | (d90 − d10)/d50 | (d90 + d10)/(2 × d50) |
|---|---|---|---|---|---|
| Unmilled | 53 | 32 | 70 | 0.72 | 0.96 |
| Pulverised | 8.5 | 1.0 | 27.5 | 3.12 | 1.68 |
| Milled | 10.2 | 1.8 | 25.7 | 2.33 | 1.34 |

Figure 3:
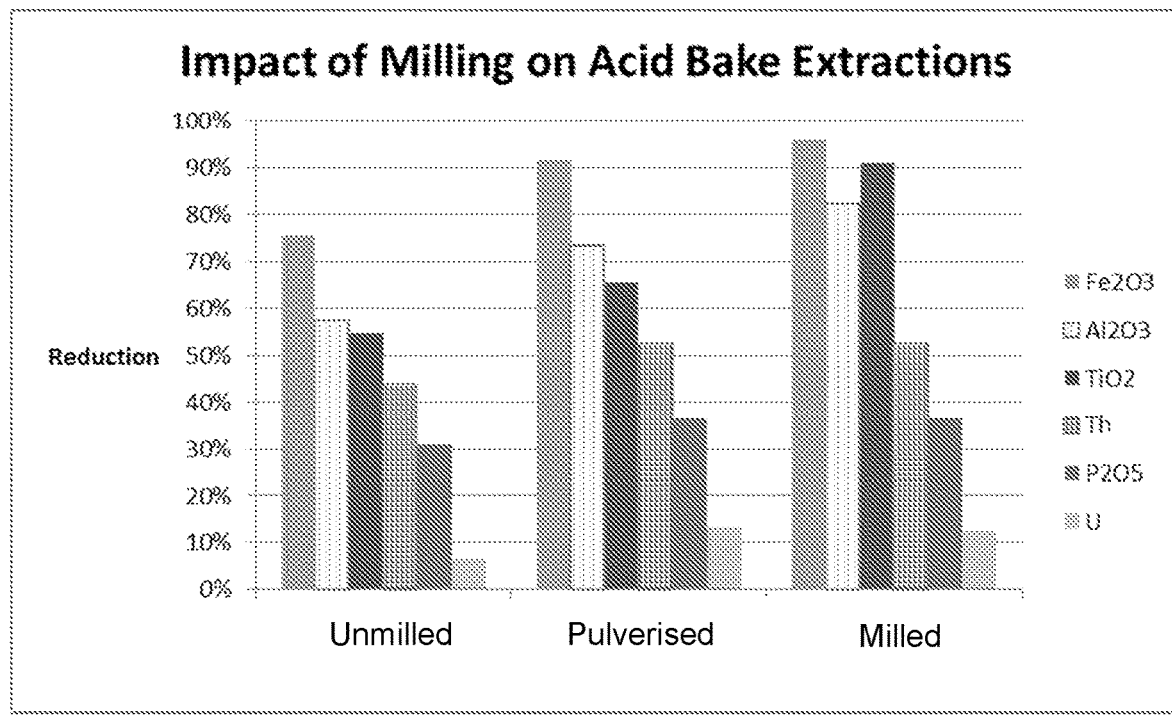
FIG. 3 is a graph showing the impact of milling on the extraction of impurities from zircon.

FIG. 3 shows that comminution of the zircon feed prior to the baking process improves the extraction of key impurities. Broadly, it is thought that this improvement is due to exposure of impurity rich zircon phases to the acid reaction interface. The relative improvement in extraction efficiency of the comminuted zircon feeds (e.g. the pulverized and milled samples) over the unmilled sample is due to the smaller average particle size of that zircon feed.

Interestingly, even though the pulverized sample has a lower d50 value than the milled sample, the milled sample exhibits improved extraction of Fe, Al, and Ti. This is due to the higher d90 value of the pulverized feed as compared with the milled feed. A higher d90 value indicates the presence of coarser material. It is more difficult to extract impurities from this coarser, unliberated material.

Given the above, the relative improvement between the pulverizing and milling of the samples, lies in the particle size distribution (PSD). It was found that pulverizing samples resulted in a broader PSD resulting in more coarser, poorly liberated impure zircon particles, whereas the attrition mill provided a tighter particle size distribution, ensuring better liberation, and greater reaction surface area of the impure zircon phases. This has a most notable impact on the extraction of $TiO_2$ and $Fe_2O_3$ in the zircon product. This is illustrated in Table 6 above, which includes two comparative particle size distribution ratios (see last two columns) to characterise the relative narrowness of the particle size distribution. For each case, the lower the particle size distribution ratio value, the narrower the particle size distribution.

Example 7

Samples of two zircons were attrition milled to an average particle size of 1.5 microns. The zircon was then baked with 98% $H_2SO_4$ at an acid:zircon mass ratio of 1:2 for 2 hours at approximately 300° C. The resulting solids were leached with ambient temperature water for 3 hours at a solids:liquid mass ratio of 1:1.

Both samples were split into three fractions. The first sub-samples were submitted for assay. The second sub-samples were leached with 1 mol/L sodium hydroxide at 80° C. for 1 h. The third sub samples were leached with 1 mol/L sodium hydroxide at 80° C. for 1 h, washed, then leached with 1 mol/L HCl at 80° C. for 1 h.

The final mixtures were filtered and washed with a water:solids mass ratio of 2:1. CIELAB measurements were not taken on these samples.

TABLE 7

Comparison between raw and treated zircon compositions (subjected to different polishing steps)

| Sample | $TiO_2$ % | $Fe_2O_3$ % | $SiO_2$ % | $(Zr + Hf)O_2$ % | $P_2O_5$ % | $Al_2O_3$ % | $SO_3$ % | Th ppm | U ppm |
|---|---|---|---|---|---|---|---|---|---|
| Zircon 1 | | | | | | | | | |
| Feed | 0.86 | 0.40 | 31.7 | 61.9 | 0.33 | 2.21 | 0.10 | 589 | 432 |
| Acid Bake | 0.12 | 0.07 | 38.0 | 57.2 | 0.20 | 0.35 | 2.14 | 176 | 280 |
| Acid Bake + Caustic leach | 0.14 | 0.08 | 33.3 | 63.5 | 0.11 | 0.37 | 0.24 | 193 | 297 |
| Acid Bake + Caustic Leach + HCl leach | 0.10 | 0.06 | 33.5 | 64.3 | 0.12 | 0.21 | 0.24 | 176 | 314 |
| Zircon 2 | | | | | | | | | |
| Feed | 0.73 | 0.26 | 32.1 | 65.73 | 0.27 | 0.17 | <0.01 | 352 | 475 |
| Acid Bake | 0.08 | 0.00 | 37.0 | 60.32 | 0.19 | 0.02 | 0.85 | 132 | 339 |
| Acid Bake + Caustic Leach | 0.10 | 0.01 | 32.7 | 65.55 | 0.15 | 0.05 | 0.14 | 158 | 382 |
| Acid Bake + Caustic Leach + HCl leach | 0.05 | 0.01 | 32.8 | 65.74 | 0.16 | 0.03 | 0.14 | 141 | 382 |

The invention claimed is:

1. A process for improving the grade and optical quality of zircon, comprising:
   baking a mixture of a zircon feed and concentrated sulphuric acid at a baking temperature in the range of from 250° C. up to 330° C., and for a time to form water leachable sulphates with impurities therein including at least iron and titanium;
   leaching the baked mixture to dissolve the leachable sulphates; and
   separating the zircon from the leachate containing the leached sulphates, which separated zircon is thereby of improved grade and optical quality.

2. A process according to claim 1, wherein the baking temperature range is from 270° C. to 330° C.

3. A process according to claim 1 including preparing the zircon feed for the baking step by comminution.

4. A process according to claim 3, wherein the comminution step includes milling the zircon.

5. A process according to claim 1, wherein the zircon feed has a d50 value of 50 μm or less.

6. A process according to claim 1, wherein the leachable sulfates include or more sulphate species of iron, titanium, lanthanide and actinide elements.

7. A process according to claim 1, wherein the leachate, used in the step of leaching the baked mixture, is water or a dilute acid.

8. A process according 1, further including alkaline leaching the separated zircon.

9. A process according to claim 1 wherein the step of leaching the baked mixture is conducted at a temperature of below 50° C.

10. A process according to claim 1, wherein the sulphuric acid and zircon feed are mixed to ensure that solids in the zircon feed are fully wetted.

11. A process according to claim 1, wherein the sulphuric acid to zircon mass ratio is 1:9 to 1:2.

12. A process according to claim 1, wherein the concentrated sulphuric acid has a concentration of 96 wt % or greater.

13. A process according to claim 1, wherein the zircon feed comprises damaged and undamaged zircon, and wherein there is no decomposition of the undamaged zircon.

14. A process according to claim 9, wherein the leachate, used in the step of leaching the baked mixture, is water or a dilute acid.

15. A process according to claim 1, further including alkaline leaching the separated zircon.

16. A process for improving the grade and optical quality of zircon, comprising:
  baking a mixture of a zircon feed having a d50 value of 50 μm or less and concentrated sulphuric acid at a baking temperature in the range of from 270° C. up to 330° C. and for a time to form water leachable sulphates with impurities therein including at least iron and titanium;
  leaching the baked mixture with water or dilute acid at a temperature below 50° C. to dissolve the leachable sulphates; and
  separating the zircon from the leachate containing the leaches sulphates, which separated zircon is thereby of improved grade and optical quality.

17. A process according to claim 16, further including alkaline leaching the separated zircon.

* * * * *